(12) United States Patent
Szanyi et al.

(10) Patent No.: US 6,797,388 B1
(45) Date of Patent: Sep. 28, 2004

(54) METHODS OF MAKING LOW HAZE COATINGS AND THE COATINGS AND COATED ARTICLES MADE THEREBY

(75) Inventors: Janos Szanyi, Oakmont, PA (US); John F. Sopko, Trafford, PA (US); George A. Neuman, Suwanee, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/521,845

(22) Filed: Mar. 9, 2000

Related U.S. Application Data
(60) Provisional application No. 60/172,283, filed on Dec. 17, 1999, and provisional application No. 60/125,050, filed on Mar. 18, 1999.

(51) Int. Cl.⁷ .............................................. B32B 17/06
(52) U.S. Cl. ........................ 428/432; 428/216; 428/426; 428/428; 428/432; 428/448; 428/689; 428/697; 428/699; 428/701; 428/702; 428/704; 427/164; 427/165
(58) Field of Search ................................ 428/697, 699, 428/701, 216, 426, 428, 432, 448, 689, 702, 704; 427/164, 165

(56) References Cited

U.S. PATENT DOCUMENTS

| | | | |
|---|---|---|---|
| 3,473,944 A | 10/1969 | Dates | 117/33.3 |
| 3,652,246 A | 3/1972 | Michelotti et al. | 65/181 |
| 4,187,336 A | 2/1980 | Gordon | 428/34 |
| 4,206,252 A | 6/1980 | Gordon | 427/160 |
| 4,351,861 A | 9/1982 | Henery | 427/255.1 |
| 4,419,386 A | 12/1983 | Gordon | 427/109 |
| 4,440,822 A | 4/1984 | Gordon | 428/216 |
| 4,504,109 A | 3/1985 | Taga et al. | 350/1.6 |
| 4,716,086 A | 12/1987 | Gillery et al. | 428/630 |
| 4,719,126 A | 1/1988 | Henery | 427/165 |
| 4,746,347 A | 5/1988 | Sensi | 65/94 |
| 4,775,203 A | 10/1988 | Vakil et al. | 350/1.7 |
| 4,786,563 A | 11/1988 | Gillery et al. | 428/630 |
| 4,792,536 A | 12/1988 | Pecoraro et al. | 501/70 |

(List continued on next page.)

FOREIGN PATENT DOCUMENTS

| | | |
|---|---|---|
| CA | 2156571 | 2/1996 |
| EP | 0 521 602 | 1/1993 |
| EP | 0 782 975 | 7/1997 |
| EP | 0 902 333 | 3/1999 |
| EP | 0 980 850 | 2/2000 |
| EP | 0 983 972 | 3/2000 |
| EP | 1 038 849 | 9/2000 |
| GB | 2 252 332 | 8/1992 |
| GB | 2302102 | 1/1997 |
| GB | 2 302 102 | 1/1997 |
| GB | 2 335 201 | 9/1999 |
| WO | 93/12892 | 7/1993 |
| WO | 95/29883 | 11/1995 |
| WO | 99/02336 | 1/1999 |

*Primary Examiner*—Terrel Morris
*Assistant Examiner*—Andrew T Piziali
(74) *Attorney, Agent, or Firm*—Andrew C. Siminerio

(57) ABSTRACT

A coating in accordance with the invention has a substantially crystalline first layer with a substantially crystalline second layer provided over the first layer. A breaker layer is provided between the first and second layers and is configured to prevent or at least reduce epitaxial growth of the second layer on the first layer. A color suppression layer may be provided below the first layer. The coating can be provided on a substrate to make a coated article. A method of coating a substrate includes depositing a substantially crystalline first layer over at least a portion of the substrate and depositing a breaker layer over the first layer. The breaker layer is configured to prevent or at least reduce epitaxial growth of a subsequently deposited layer on the first layer.

36 Claims, 5 Drawing Sheets

U.S. PATENT DOCUMENTS

| | | | |
|---|---|---|---|
| 4,853,257 A | 8/1989 | Henery | 427/166 |
| 4,952,423 A | 8/1990 | Hirata et al. | 427/109 |
| 5,168,003 A | 12/1992 | Proscia | 428/216 |
| 5,240,886 A | 8/1993 | Gulotta et al. | 501/70 |
| 5,344,718 A | 9/1994 | Hartig et al. | 428/623 |
| 5,356,718 A | 10/1994 | Athey et al. | 428/428 |
| 5,376,455 A | 12/1994 | Hartig et al. | 428/428 |
| 5,385,872 A | 1/1995 | Gulotta et al. | 501/71 |
| 5,393,593 A | 2/1995 | Gulotta et al. | 428/220 |
| 5,425,861 A | 6/1995 | Hartig et al. | 204/192.26 |
| 5,532,180 A | 7/1996 | den Boer et al. | 437/40 |
| 5,584,902 A | 12/1996 | Hartig et al. | 65/32.4 |
| 5,744,215 A | 4/1998 | Neuman | 428/141 |
| 5,776,236 A | 7/1998 | Neuman et al. | 106/287.17 |
| 5,780,149 A | 7/1998 | McCurdy et al. | 428/336 |
| 5,811,191 A | 9/1998 | Neuman | 428/427 |
| 5,834,103 A | 11/1998 | Bond et al. | 428/216 |
| 6,218,018 B1 | 4/2001 | McKown et al. | 428/432 |
| 6,231,971 B1 | 5/2001 | Terneu et al. | 428/336 |

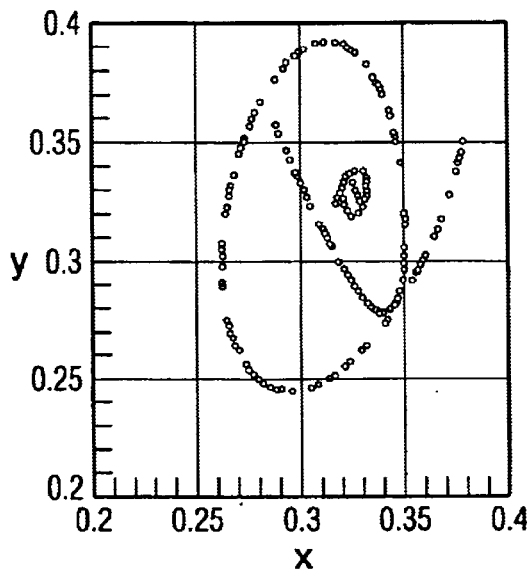

|                     | REFL  | TRANS |
|---------------------|-------|-------|
| x COORDINATE:       | 0.338 | 0.321 |
| y COORDINATE:       | 0.371 | 0.323 |
| LUMINOSITY (%):     | 14.24 | 60.18 |
| DOMINANT (nm):      | 569   | 585   |
| COMPLEMENTARY (nm): | 450   | 484   |
| EXCITATION PURITY:  | 0.223 | 0.047 |

COLOR STANDARD: 1931 CIE
FIELD OF VIEW: 2°
POLARIZATION: AVERAGE
REFERENCE WHITE: CIE-C
ILLUMINANT: WHITE
INCIDENT ANGLE (DEG): 0.00

*FIG. 8*

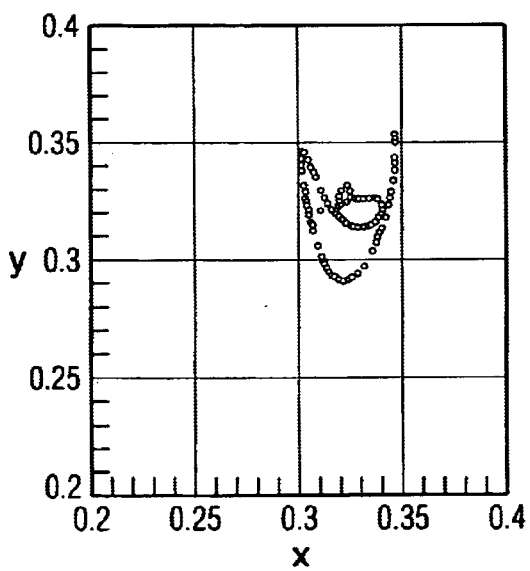

COLOR STANDARD: 1931 CIE
FIELD OF VIEW: 2°
POLARIZATION: AVERAGE
REFERENCE WHITE: CIE-C
ILLUMINANT: WHITE
INCIDENT ANGLE (DEG): 0.00

|                     | REFL  | TRANS |
|---------------------|-------|-------|
| x COORDINATE:       | 0.305 | 0.325 |
| y COORDINATE:       | 0.341 | 0.325 |
| LUMINOSITY (%):     | 11.06 | 57.92 |
| DOMINANT (nm):      | 539   | 584   |
| COMPLEMENTARY (nm): | N/A   | 483   |
| EXCITATION PURITY:  | 0.057 | 0.065 |

*FIG. 9*

METHODS OF MAKING LOW HAZE COATINGS AND THE COATINGS AND COATED ARTICLES MADE THEREBY

CROSS-REFERENCE TO RELATED APPLICATIONS

This application claims the benefits of U.S. Provisional Application Serial No. 60/172,283, filed Dec. 17, 1999, and U.S. Provisional Application Serial No. 60/125,050, filed Mar. 18, 1999, the disclosures of which provisional applications are herein incorporated by reference.

BACKGROUND OF THE INVENTION

1. Field of the Invention

This invention relates generally to coating and coated articles and, more particularly, to methods of depositing coatings and making coated articles having low haze and/or low emissivity. This invention also relates to solar control coating for articles to reduce the transmission of infrared (IR) energy, particularly near infrared (NIR) energy, while maintaining a relatively high visible light transmission and substantially neutral transmitted and/or reflected color of the coated article.

2. Description of the Currently Available Technology

Low emissivity coatings deposited on a substrate, e.g., a glass substrate, are used in many applications, such as see-through freezer doors, oven door windows, architectural windows, e.g., commercial or residential windows, and vehicle windows, to name a few. Emissivity refers to the energy emitting or radiating propensity of a surface. "Low emissivity coatings" allow ultraviolet (UV) energy, e.g., below 400 nm, and visible wavelength energy, e.g., 400 nm to about 780 nm, to be transmitted through a window but reflect infrared (IR) energy, e.g., greater than about 780 nm. Such low emissivity coatings are attractive for use with architectural windows, for example, since they prevent radiant heat loss through the window during cold periods, reducing heating costs during the winter and air conditioning costs during the summer.

Low emissivity coatings, however, are not well suited for use in warmer climates, such as the Southern United States, since low emissivity coatings transmit a high percentage of visible light during the day that can heat the interior of the building, thus increasing cooling costs. Examples of commonly used low emissivity coatings include metal oxides, such as tin oxide ($SnO_2$), or doped metal oxides, such as fluorine (F) doped tin oxide. U.S. Pat. No. 4,952,423 discloses a fluorine-doped tin oxide low emissivity coating.

In warmer climates, coatings which provide not only low emissivity but also solar control properties, such as solar energy reflection or absorption or a low shading coefficient, are desirable. The term "shading coefficient" is generally used in the glass industry and relates to the heat gain obtained when an environment is exposed to solar radiation through a given area of opening or glazing to the heat gained through the same size area of a ⅛ inch thick single-pane clear glass (ASHRAE Standard Calculation Method). The ⅛" thick clear glass is assigned a value of 1.00. A shading coefficient value below 1.00 indicates better heat rejection than the single-pane clear glass and vice versa.

Fluorine doped tin oxide provides low emissivity characteristics. Tin oxide doped with other materials, such as antimony (Sb), can have solar energy reflecting and absorbing characteristics. Antimony doped tin oxide coatings are more highly solar energy absorbing than tin oxide alone. The doping of tin oxide with antimony improves absorption of near infrared solar energy and also decreases the transmission of visible light, characteristics particularly useful in warm climates to prevent overheating of the interior of a building or vehicle in the summer months.

In addition to tin oxide, other metal oxides used in the formation of low emissivity and/or solar control coatings include $Sb_2O_3$, $TiO_2$, $Co_3O_4$, $Cr_2O_3$, $InO_2$ and $SiO_2$. However, tin oxide has advantages over these other metal oxides because of its abrasion resistance, hardness and conductive properties. The advantages of both low emissivity and solar control can be obtained by providing a coating having both a low emissivity coating material, such as fluorine doped tin oxide, with a solar control coating material, such as an antimony doped tin oxide, or by providing a coating having mixed emissivity and solar control materials, such as tin oxide doped with both antimony and fluorine. An example of one such coating is disclosed in GB 2,302,102.

U.S. Pat. No. 4,504,109 discloses an infrared shielding lamination having alternate infrared shield layers and inferential reflection layers.

GB 2,302,102 discloses a coating having a single layer of tin/antimony oxide in which the tin and antimony are in a specified molar ratio, and also discloses a fluorine doped tin oxide layer applied onto a tin/antimony oxide layer.

As a general rule for metal oxide or doped metal oxide coatings, as the coating thickness increases, the emissivity of the coating decreases and the conductivity increases. Therefore, if no other factors were involved, a solar control coating having a low emissivity, e.g., less than about 0.2, could be obtained simply by increasing the coating thickness to a level to provide the desired emissivity. However, increasing the coating thickness also has the disadvantages of increasing the coating haze, i.e., the amount or percent of light scattered upon passing through an object, and of decreasing the amount of visible light transmission. Such coatings may also exhibit undesirable iridescence. Particularly for architectural or vehicle windows, such haze and iridescence are not desired.

For most commercial applications, haze greater than about 1.5% is typically considered objectionable. Therefore, the ability to provide a low emissivity coating with or without solar control properties has thus far been limited by the necessity to minimize the coating haze to commercially acceptable levels.

GB 2,302,102 hypothesizes that such coating haze is due to internal haze caused by the migration of sodium ions from the glass substrate into the coating and proposes providing a non-stoichiometric silicon oxide barrier layer between the glass substrate and the coating to block sodium ion migration to reduce haze.

Many known infrared reflective coatings also exhibit iridescence or interference colors with reflected and transmitted light. Coated transparencies, such as vehicle windows, that provide lower infrared transmittance and lower total solar energy transmittance to reduce the heat gain in the vehicle interior should also preferably be of a substantially neutral, e.g., gray, color so as not to clash with the overall color of the vehicle.

As will be appreciated by one of ordinary skill in the art, it would be advantageous to provide a coating, coated article and/or coating method which provide a relatively low emissivity coating, e.g., a coating with an emissivity less than about 0.2, which also has a low haze, e.g., less than about 2.0%. It would also be advantageous to provide a coating and/or coated article having reduced infrared transmission and/or a low shading coefficient while maintaining a relatively high visible light transmission and reduced iridescence.

SUMMARY OF THE INVENTION

A coating of the invention includes a first coating surface, a second coating surface, and a breaker layer located between the first and second coating surfaces. The breaker layer is configured to interrupt the crystalline structure of the coating.

A further coating of the invention includes a substantially crystalline first layer, a substantially crystalline second layer deposited over the first layer, and a breaker layer located between the first and second layers. The breaker layer is configured to prevent or at least reduce epitaxial growth of the second layer on the first layer.

Another coating includes a substantially crystalline first layer including antimony doped tin oxide having a thickness of, for example, about 1200 Å to about 2300 Å; a substantially crystalline second layer deposited over the first layer, the second layer including fluorine doped tin oxide and having a thickness of, for example, about 3000 Å to about 3600 Å; and a breaker layer located between the first and second crystalline layers. The breaker layer, e.g., an amorphous layer, prevents or at least reduces epitaxial growth of the second layer on the first layer.

A coated article of the invention includes a substrate and a coating deposited over at least a portion of the substrate. The coating includes a first coating surface and a second coating surface, with a breaker layer of the invention located between the first and second coating surfaces.

A further coated article of the invention includes a substrate, a substantially crystalline first layer deposited over at least a portion of the substrate, a breaker layer deposited over the first layer, and a substantially crystalline second layer deposited over the breaker layer.

An additional coated article includes a substrate, a substantially crystalline first layer deposited over at least a portion of the substrate, and a breaker layer deposited over at least a portion of the first layer. The breaker layer is configured to prevent or at least reduce epitaxial growth of a subsequently deposited substantially crystalline coating layer onto the coated article.

A further coated article includes a substrate, a color suppression layer deposited over at least a portion of the substrate, and a first substantially transparent, conductive metal oxide layer deposited over the color suppression layer and having a thickness of, for example, about 700 Å to about 3000 Å. The color suppression layer is preferably graded, with a thickness of, for example, about 50 Å to about 3000 Å.

Another coated article includes a substrate, an antimony doped tin oxide layer deposited over at least a portion of the substrate and having a thickness of, for example, about 900 Å to about 1500 Å, and a fluorine doped tin oxide layer deposited over the antimony doped tin oxide layer and having a thickness of, for example, about 1200 Å to about 3600 Å. The antimony doped tin oxide layer preferably has at least two stratas of different antimony concentrations, with a first strata having a thickness of, for example, about 985 Å and a second strata having a thickness of, for example, about 214 Å.

A still further coated article includes a substrate, a first doped metal oxide layer deposited over at least a portion of the substrate, and a second doped metal oxide layer deposited over the first doped metal oxide layer. The first doped metal oxide layer has a lower refractive index than that of the second doped metal oxide layer.

A further coated article includes a substrate, a color suppression layer deposited over at least a portion of the substrate, a substantially crystalline first layer deposited over the color suppression layer, a substantially crystalline second layer deposited over the first layer, and a breaker layer of the invention located between the first and second layers.

An additional coated article includes a substrate, a first coating region deposited over at least a portion of the substrate, the first coating region including a metal oxide and a first dopant; a transition region deposited over the first region, the transition region including a metal oxide, the first dopant, and a second dopant, with the ratio of the first dopant to the second dopant constantly changing with distance from the substrate; and a third coating region deposited over the second coating region, the third coating region including a metal oxide and the second dopant. Optionally, one or more breaker layers of the invention may be interposed within the coating stack.

A method of coating a substrate includes depositing a substantially crystalline first layer over at least a portion of a substrate, depositing a breaker layer over the first layer, and depositing a substantially crystalline second layer over the breaker layer. The breaker layer is configured to prohibit or reduce epitaxial growth of the second layer onto the first layer.

Another method of coating a substrate includes depositing a substantially crystalline first layer over at least a portion of a substrate, and depositing a breaker layer over the first crystalline layer. The breaker layer is configured to prevent or at least reduce epitaxial growth of a subsequently deposited crystalline layer onto the first crystalline layer.

A further method of forming a coated article includes providing a substrate, depositing a color suppression layer over at least a portion of the substrate, the color suppression layer having a thickness of, for example, about 50 Å to about 3000 Å, and depositing a first substantially transparent conductive metal oxide layer over the color suppression layer, with the first conductive metal oxide layer being, for example, antimony doped tin oxide having a thickness of, for example, about 700 Å to about 3000 Å.

BRIEF DESCRIPTION OF THE DRAWINGS

A complete understanding of the invention will be obtained from the following description when taken in connection with the accompanying drawing figures, wherein like reference numbers identify like parts throughout.

FIG. 8 is a graph of color variation with changes in fluorine doped tin oxide layer thickness;

FIG. 9 is a graph of color variation with changes in fluorine doped tin oxide layer thickness for a coating having a fluorine doped tin oxide layer over two antimony doped tin oxide stratas.

DESCRIPTION OF THE PREFERRED EMBODIMENTS

Figure 1:
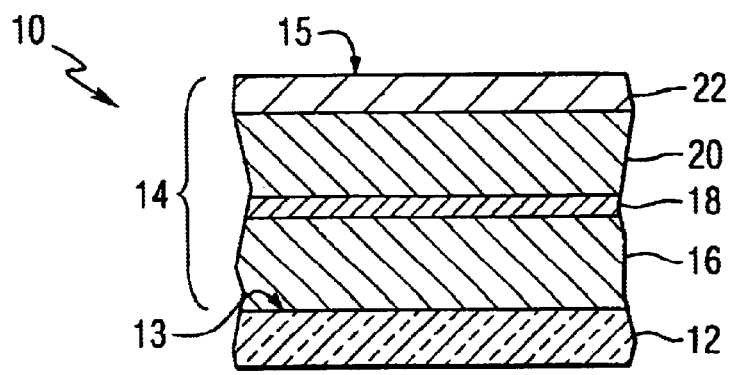
FIG. 1 is a side, sectional view (not to scale) of a coating and coated article incorporating features of the invention.

Other than in the operating examples, or where otherwise indicated, all numbers expressing quantities of ingredients, reaction conditions, and so forth used in the specification and claims are to be understood as being modified in all instances by the term "about". Additionally, any numeric reference to amounts, unless otherwise specified, is "by weight".

Looking first at the problem of haze, it is herein v postulated that for crystalline or substantially crystalline coatings, e.g., low emissivity metal oxide crystalline coatings, greater than about 2000 Å to about 4000 Å thick, coating haze is due primarily to the surface morphology of the coating and not to internal haze factors as previously thought.

As a general rule, low emissivity and/or solar control coatings are typically made to be crystalline because the crystalline structure provides the advantages of better adhesion to glass substrates, increased durability and also provides faster coating growth and hence greater chemical efficiency. Another advantage of crystalline structure is that it increases electrical conductivity, which promotes lower emissivity. However, this crystalline coating structure, whether formed from one or more coating layers or materials, may lead to the formation of large, e.g., greater than about 2000 Å to about 4000 Å thick, single crystal structures which lead to high surface rugosity or roughness and hence high haze, i.e., greater than about 2%.

For example, to form a crystalline low emissivity/solar control coating having a fluorine (F) doped tin oxide ($SnO_2$) layer over an antimony (Sb) doped tin oxide layer, tin oxide and antimony precursors are first applied to a substrate. The antimony and tin oxide precursors nucleate on the substrate surface to begin forming antimony doped tin oxide crystal that grow in size as more precursor material is applied. When the first crystalline layer is at a desired thickness, fluorine and tin oxide precursors are deposited over the first layer to form a crystalline fluorine doped tin oxide second layer. As used herein, the terms "doped" and "dopant" refer to a material that may be present in the crystal structure of another material or may be present in the interstices of the other material.

However, it has now been determined that if the precursor materials for the second crystalline layer are deposited directly onto the first crystalline layer, the crystals of the second crystalline layer tends to grow epitaxially on the crystals of the first crystalline layer, i.e., do not nucleate but rather continue the crystalline structure from the first layer crystals to form large, elongated, single crystalline structures extending upwardly substantially through the entire coating thickness, with the lower portion of the crystalline structure being antimony doped tin oxide and the upper portion of the crystalline structure being fluorine doped tin oxide. This epitaxial crystal growth results in a coating with a very high surface roughness and hence unacceptably high haze, e.g., greater than about 2%. High surface roughness has been confirmed by atomic force microscopy (AFM) and scanning electron microscopy (SEM) and is believed to be the primary contributor to the overall coating haze of such crystalline coatings because haze is reduced when the surfaces are polished.

Based on this new understanding, the present invention provides a coating and coating method which allow for the formation of low emissivity and/or solar control coatings, e.g., composite or multi-layer, crystalline metal oxide coatings on a substrate which maintain the advantages of the crystalline structure described above but which prevent or reduce epitaxial crystal growth common in previous coating processes and, hence, reduce the haze of the resulting coating.

A coated article 10 incorporating features of the invention is shown in FIG. 1. The article 10 includes a substrate 12 with a coating stack or "coating" 14 deposited over at least a portion of the substrate 12, usually over an entire surface of the substrate 12. The coating 14 has an inner or first surface 13 and an outer or second surface 15. As used herein, the terms "deposited over" or "provided over" mean deposited or provided above, i.e. at a greater distance from the substrate, but not necessarily in surface contact with. For example, a first coating region or layer "deposited over" a second coating region or layer does not preclude the presence of one or more other coating regions or layers between the first and second coating layers.

The coating 14 includes a first region or layer 16 and a second region or layer 20 with a crystal growth "breaker" region or layer 18 of the invention located between the first and second layers 16 and 20. An outer protective layer 22 may be deposited over the second layer 20. The term "layer" is used herein to refer to a coating region of a selected coating composition. For example, a fluorine doped tin oxide layer is a region of the coating predominately made up of fluorine doped tin oxide. However, it is to be understood that there may be no distinct interface between adjacent "slayers" and that the "layers" can simply be different regions of the same coating material.

The substrate 12 is preferably a transparent, semi-transparent or translucent material, e.g., such as plastic, ceramic or, more preferably, glass. For example, the glass can be clear float glass or can be clear, tinted or colored flat glass. The glass may be of any composition having any optical properties, e.g., any value of visible transmission, ultraviolet transmission, infrared transmission and/or total solar energy transmission. Types of glass that may be used in the practice of the invention, but not limited thereto, are disclosed in U.S. Pat. Nos. 4,746,347; 4,792,536; 5,240,886; 5,385,872 and 5,393,593. The substrate 12 may be of any thickness but preferably has a thickness of about 2 mm to about 13 mm, preferably about 2.2 mm to about 6 mm.

The coating 14 is preferably a multi-component coating, i.e., contains a plurality of layers or regions of different composition, deposited over at least a portion of the substrate surface in any convenient manner, such as but not limited to magnetron sputter vapor deposition (MSVD), chemical vapor deposition (CVD), spray pyrolysis, sol-gel, etc. In the currently preferred practice of the invention, the coating 14 is applied by CVD.

Methods of CVD coating are well understood by one in the thin film deposition art and, hence, will not be discussed in detail. In a typical pyrolytic coating process, such as a CVD coating process, gaseous or vaporous precursor materials, or a mixture of such precursor materials, are directed toward the surface of a hot substrate. The precursor materials pyrolyze and nucleate on the substrate surface to form a solid coating material, typically an oxide material, the composition of which is determined by the type and/or amount of the precursor materials used and the composition of the carrier gas.

With continuing reference to FIG. 1, the first region or layer 16 preferably includes a metal oxide material, such as an oxide of one or more of Zn, Fe, Mn, Al, Ce, Sn, Sb, Hf, Zr, Ni, Zn, Bi, Ti, Co, Cr, Si or In or an alloy, such as zinc stannate. The first layer 16 preferably also includes one or more dopant materials, such as Sn, F, In, or Sb. In the currently preferred practice of the invention, the first layer 16 is tin oxide doped with antimony, with the antimony present in the precursor materials in an amount less than about 10 weight percent based on a total weight of precursor materials, more preferably less than about 7.5 weight percent. In a currently preferred embodiment, the first layer 16 preferably has a thickness of about 1000 Å to about 2300 Å, more preferably about 1700 Å to about 2300 Å, and most preferably about 2000 Å. In this currently preferred embodiment, it is preferred that the atomic ratio of tin to antimony (Sn/Sb) in the deposited first layer 16 be about 8 to about 12, more preferably about 10 to about 11, as measured by x-ray fluorescence. The first layer 16 is preferably applied such that the structure of the first layer 16 is crystalline or substantially crystalline, i.e., greater than about 75% crystalline. The antimony doped tin oxide first layer 16 promotes absorption of visible and near infrared solar energy.

Although presently preferred, the first layer 16 is not limited to antimony doped tin oxide. The first layer 16 could also include one or more metal oxides, such as tin oxide, doped with a plurality of dopants, such as both antimony and fluorine. Alternatively, the first layer 16 could be a gradient layer with, for example, a mixture of fluorine doped tin oxide and antimony doped tin oxide with a continuously changing composition as the distance from the substrate 12 increases. For example, near the substrate surface the first layer 16 could be predominately antimony doped tin oxide while the outer surface or region of the first layer 16 could be predominately fluorine doped tin oxide with a continuously changing ratio of antimony to fluorine therebetween. A suitable method of making such a gradient layer is disclosed in U.S. Pat. No. 5,356,718, herein incorporated by reference.

Still further, the first layer 16 can include two or more metal oxide strata or regions, e.g., of tin oxide, with the stratas having a different dopant concentration. A suitable method of forming such strata is also disclosed in U.S. Pat. No. 5,356,718.

The second layer 20 is preferably a metal oxide layer, preferably a doped metal oxide layer, and may be similar to the first layer 16 described above. Although not to be considered as limiting, in the currently preferred practice of the invention, the second layer 20 is a fluorine doped tin oxide layer, with the fluorine present in the precursor materials in an amount less than about 20 weight percent based on the total weight of the precursor materials, preferably less than about 15 weight percent, and more preferably less than about 13 weight percent. Although not specifically measured, it is estimated that the fluorine is present in the deposited second layer 20 in an amount less than about 5 atomic percent. It is believed that if fluorine is present at greater than about 5 atomic percent, it may affect the coating conductivity which can change the coating emissivity. The second layer 20 is also crystalline or substantially crystalline. In a currently preferred embodiment, the second layer 20 preferably has a thickness of about 2000 Å to about 5000 Å, more preferably about 3000 Å to about 3600 Å. The fluorine doped tin oxide second layer 20 promotes low emissivity.

In accordance with the invention, the breaker layer 18 is located between the first and second crystalline layers 16 and 20. The breaker layer 16 is a region or layer which prevents, inhibits or reduces epitaxial crystal growth of the substantially crystalline second layer 20 onto the substantially crystalline first layer 16, for example, by disrupting or interrupting the crystal structure of the coating. Although not to be considered as limiting, in the currently preferred practice of the invention the breaker layer 18 is preferably an amorphous layer. Thus, when the second layer 20 is formed, the second layer precursor materials nucleate on the breaker layer 18 and do not grow epitaxially on the crystalline first layer 16. This prevents or reduces crystals of the second layer 20 from continuing the crystal structure of the first layer crystals to inhibit the formation of a plurality of single, substantially continuous, saw-tooth shaped crystals extending substantially through the coating and hence reduces surface roughness which in turn reduces the haze of the coating 14.

While in the currently preferred practice of the invention the breaker layer 18 is preferably amorphous, the breaker layer 18 can also be a non-amorphous layer which promotes the formation of smaller crystals in the second layer 20 then would be formed in the absence of the breaker layer 18. For example, the breaker layer 18 can be a crystalline, polycrystalline, or substantially crystalline layer with different lattice parameters than the first layer 16 to provide a lattice mismatch to disrupt or interrupt the crystal growth of the coating. The breaker layer 18 should be thick enough to prevent, inhibit, or reduce epitaxial crystal growth of the second layer crystals on the first layer crystals but should not be so thick as to adversely impact upon the mechanical or optical characteristics of the coating 14. In the currently preferred practice of the invention, the breaker layer 18 is less than about 1000 Å thick, more preferably about 100 Å to about 600 Å thick.

The breaker layer 18 and/or the first layer 16 and/or the second layer 20 can be homogeneous, non-homogeneous or graded compositional change. A layer is "homogeneous" when the top surface or portion, the bottom surface or portion, and portions of the layer between the top and bottom surfaces have substantially the same chemical composition moving from the bottom surface to the top surface and vice versa. A layer is "graded" when the layer has a substantially increasing fraction of one or more components and a substantially decreasing fraction of one or more other components when moving from the top surface to the bottom surface or vice versa. A layer is "non-homogeneous" when the layer is other than homogeneous or graded.

In a currently preferred practice of the invention, the breaker layer 18 as a phosphorous containing metal oxide layer, e.g., a tin oxide layer, with the phosphorous present in the dposition precursor material mixture in an amount less than about 20 weight percent, preferably less than about 10 weight percent, and more preferably about 3 weight percent based on a total weight of the precursor material mixture. It is believed that the phosphorous and tin oxide precursor materials form a mixed oxide or solid solution when deposited on the first layer 16, i.e., the phosphorous and tin oxide are together in solid form without either losing its chemical identity. Although not specifically measured, it is estimated that the atomic ratio of phosphorous to tin (P/Sn) in a currently preferred embodiment of a deposited breaker layer 18 is about 0.01 to about 0.10, more probably about 0.03 to about 0.08, and most probably about 0.04 to about 0.06. In the preferred practice of the invention, the breaker layer 18 is preferably not an alloy because it is preferably not crystalline.

In an alternative embodiment, the breaker layer 18 may be a mixed oxide of tin and silica, e.g., a solid tin and silicon oxide solution. In a currently preferred practice, the silica precursor material includes less than about 20 weight percent of the combined silica and tin precursor materials based on the total weight of the combined silica and tin precursor materials. In a currently preferred embodiment of the invention, the atomic ratio of silicon to tin (Si/Sn) in the deposited breaker layer 18 is estimated to be about 0.005 to about 0.050, more probably about 0.010 to about 0.035, and most probably about 0.015 to about 0.025. The breaker layer 18 could also be a mixture of crystal growth inhibiting or disrupting materials, such as a metal oxide with both phosphorous and silica.

The protective layer 22 is preferably a chemically resistant dielectric material having desirable optical properties, manageable deposition characteristics and is compatible with the other materials of the coating stack. Examples of suitable protective materials include titanium dioxide (U.S. Pat. Nos. 4,716,086 and 4,786,563), silicon dioxide (Canadian Patent No. 2,156,571), aluminum oxide and silicon nitride (U.S. Pat. Nos. 5,425,861; 5,344,718; 5,376,455; 5,584,902; 5,834,103; and 5,532,180 and PCT Publication No. WO 95/29883), silicon oxynitride, or silicon aluminum oxynitride (U.S. patent application Ser. No. 09/058,440), the disclosures of which are herein incorporated by reference.

In the currently preferred practice of the invention, the coating 14 is applied by CVD. For example, a conventional CVD coating device or "coater" having a plurality of coater slots may be spaced from a glass ribbon supported on a pool of molten metal contained in a chamber having a non-oxidizing atmosphere, e.g., of the type disclosed in U.S. Pat. No. 4,853,257, which is herein incorporated by reference. CVD coating techniques are well known to one of ordinary skill in the thin film deposition art and hence will not be discussed in detail. Examples of CVD coating apparatuses and methods are found, for example but not to be considered as limiting to the invention, in U.S. Pat. Nos. 3,652,246; 4,351,861; 4,719,126; 4,853,257; 5,356,718; and 5,776,236, which are herein incorporated by reference.

An exemplary method of forming a coating of the invention, e.g., an antimony doped tin oxide/breaker layer/ fluorine doped tin oxide coating will now be described. To deposit a first layer 16 of antimony doped tin oxide, a tin oxide precursor, such as monobutyltinchloride (MBTC), is mixed with an antimony precursor, such as $SbCl_3$ or $SbCl_5$, and the precursors are applied onto the substrate through one or more coater slots as the substrate moves under the coater. In the practice of the invention, the antimony precursor, such as $SbCl_5$, is present in an amount less than about 20 weight percent of the total weight of the combined MBTC and $SbCl_5$ material. The first layer material is applied to form a first layer 16 of preferably about 1000 Å to about 2300 Å thick, more preferably about 1700 Å to about 2300 Å.

Next, MBTC mixed with a breaker layer material is deposited over the first layer material through one or more other coater slots downstream of the first coater slot(s). Preferably, the breaker material is triethylphosphite (TEP) to provide a phosphorous containing tin oxide breaker layer 18. The TEP is preferably less than about 20 weight percent based on the total weight of the combined BMTC and TEP material, more preferably less than about 10 weight percent, and most preferably about 3 weight percent. The resultant phosphorous containing breaker layer 18 is preferably less than about 600 Å thick. Phosphorous may adversely affect optical properties of the coating 14, such as iridescence. Therefore, the thickness of the phosphorus containing breaker layer 18 should be selected to prevent epitaxial growth of a subsequent second metal oxide layer but not so thick as to adversely impact upon the optical properties of the coating 14.

Alternatively, the breaker material can be tetraethylorthosilicate (TEOS) to provide a silica and tin oxide containing breaker layer 18. In this alternative embodiment, the TEOS is preferably less than about 20 weight percent based on a total weight of the combined MBTC and TEOS precursor materials.

The remainder of the coater deposition capabilities can be used to apply a mixture of MBTC and a fluorine precursor, such as trifluoroacetic acid (TFA), onto the substrate to form the fluorine doped tin oxide second layer 20 over the breaker layer 18. The TFA preferably comprises less than about 20 weight percent of the total weight of the MBTC and TFA material, more preferably less than about 15 weight percent.

The breaker layer 18 of the present invention is not limited to use with the coating 14 described above. Rather, the inventive "breaker layer" concept can be applied to other coating stacks which provide desirable solar control properties but which may heretofore have been limited in their commercial use due to unacceptably high haze.

Figure 2:
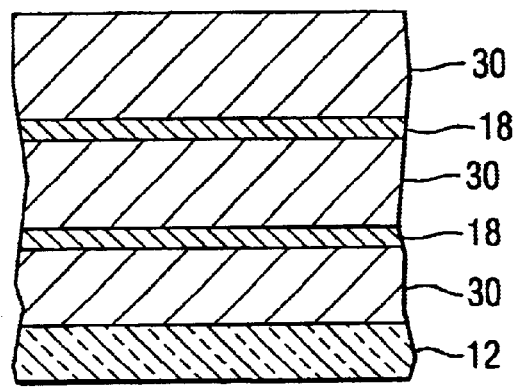
FIG. 2 is a side, sectional view (not to scale) of another coating and coated article incorporating features of the invention.

For example, as discussed above, fluorine doped tin oxide material has been used to form low emissivity coatings. However, at thicknesses greater than about 2000 Å, a conventional crystalline fluorine doped tin oxide coating exhibits commercially undesirable haze, e.g., greater than about 2%. As shown in FIG. 2, the present invention can be used to alleviate this problem by interposing one or more breaker layers 18 of the present invention into a conventional fluorine doped tin oxide coating to break the fluorine doped tin oxide coating into a plurality of fluorine doped tin oxide stratas, regions or layers 30 separated by breaker layers 18. Each crystalline fluorine doped tin oxide layer 30 is preferably less than about 4000 Å thick, more preferably less than about 3000 Å thick, still more preferably less than about 2000 Å thick, and most preferably less than about 1000 Å thick. Thus, the breaker layers 18 prevent the formation of large, fluorine doped tin oxide crystals, i.e., greater than about 2000 Å thick, and therefore reduce the resulting coating haze. Multi-layered coatings of other known coating materials, such as, but not limited to, one or more doped or non-doped crystalline metal oxides, can be formed in similar manner to reduce the formation of haze in the overall coating by incorporating one or more breaker layers 18 into the coating stack to break the coating into a plurality of crystalline coating regions, each coating region having a thickness of less than about 4000 Å, preferably less than about 3000 Å, still more preferably less than about 2000 Å, and most preferably less than about 1000 Å.

In the preferred embodiments discussed above, the breaker layer 18 of the invention is located between selected crystalline layers of the coating stack. However, the breaker layer 18 could also be used as a "topcoat", i.e. a layer deposited on top of the outermost crystalline layer of the functional coating stack to smooth out the rough outer surface of the underlying crystalline layer, in similar manner as described in U.S. Pat. No. 5,744,215, which is herein incorporated by reference. For example, one or more crystalline coating layers could be deposited over the substrate, with or without the interposition of one or more breaker layers 18 as described above, to form a functional coating stack. After the crystalline layers are deposited, a breaker layer 18 of the invention could then be deposited over the outer surface of the outermost crystalline layer to smooth out the outer crystalline surface, i.e. to fill up and/or smooth over any troughs or valleys in the rough outer crystalline surface to reduce surface haze. This breaker layer "topcoat" could then be optionally covered by a temporary or permanent protective layer 22. When used as a topcoat, it is believed that the breaker layer 18 could be of greater thickness than when used as an interlayer.

As discussed above, in addition to the problem of haze, many solar control coatings also display commercially undesirable iridescence. The present invention also provides coatings, in particular low emissivity coatings, with improved iridescence properties.

Figure 3:
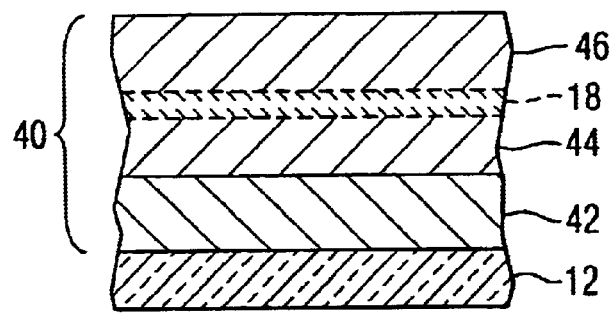
FIG. 3 is a side, sectional view (not to scale) of still another coating and coated article incorporating features of the invention.

For example, FIG. 3 shows a low emissivity coating 40 of the present invention having reduced iridescence. The coating 40 includes a color suppression layer 42 deposited over the substrate 12 with a first functional region or layer 44, e.g., a doped metal oxide layer, deposited over the color suppression layer 42. The color suppression layer 42 is preferably a gradient layer which transitions from one metal oxide or nitride to another. Examples of suitable color suppression layers 42 are disclosed, for example, in U.S. Pat. Nos. 4,187,336; 4,419,386; 4,206,252; 5,356,718; or 5,811,191, which are herein incorporated by reference. For example, the color suppression layer 42 can be a gradient layer including a mixture of silicon oxide and a metal oxide, such as tin oxide with a continuously changing composition as the distance from the substrate 12 increases. For example, near or adjacent the substrate 12 surface, the color suppression layer 42 can be predominately silicon oxide while the outer surface or region of the color suppression layer 42 can be predominantly tin oxide. The color suppression layer 42 preferably has a thickness of about 50 Å to about 3000 Å, preferably about 1000 Å. The color suppression layer 42 is preferably amorphous and may be deposited by any known deposition technique. For example, for float glass systems, conventional chemical vapor deposition (CVD) techniques are preferred. However, the color suppression layer 42 may also be deposited by other well-known techniques, such as spray pyrolysis or magnetron sputtered vacuum deposition (MSVD). Further, while a graded color suppression layer 42 is preferred, the color suppression layer 42 may also be a single component layer or multi-component layer, as is known in the art.

The first layer 44 is preferably comprised of a transparent, conductive metal oxide, such as antimony doped tin oxide, with the antimony present in an amount of about 10 weight percent to about 30 weight percent, preferably about 15 weight percent to about 20 weight percent, based on the total weight of the first layer 44 or of the precursor materials. The first layer 44 preferably has a thickness of about 700 Å to about 3000 Å. However, if the thickness of the first layer 44 is greater than about 1500 Å to about 2000 Å, one or more breaker layers 18 of the invention can be used to divide the first layer 44 into a plurality of regions or sub-layers as described above to reduce haze, with each sub-layer less than about 2000 Å thick, preferably less than about 1500 Å, and more preferably less than about 1000 Å and separated from an adjacent sub-layer by a breaker layer 18.

Optionally, a second layer 46 can be deposited over the first layer 44. As shown by dashed lines in FIG. 3, an optional breaker layer 18 of the invention can be located between the first and second layers 44 and 46. The second layer 46 is preferably a doped metal oxide material, such as tin oxide doped with fluorine and/or indium or, alternatively, indium oxide doped with tin. In a currently preferred practice, the second layer 46 is fluorine doped tin oxide with the fluorine present in an amount of about 10 weight percent to about 30 weight percent based on the total weight of the second layer 46 or of the precursor materials. The second layer 46 has a thickness of about 0 Å to about 3000 Å with the thickness of the second layer 46 being preferably inversely proportional to the thickness of the first layer 44, i.e., when the antimony doped tin oxide first layer 44 is at or near its upper preferred limit (3000 Å), the fluorine doped tin oxide second layer 46 is at or near its lower preferred limit (about 0 Å), i.e., the second layer 46 may not be present (0 Å) or, if present, is very thin (>0 Å). Conversely, when the antimony doped tin oxide first layer 44 is at or near its lower preferred limit (700 Å), the fluorine doped tin oxide second layer is preferably at or near its upper preferred limit (3000 Å). However, as discussed above, when the desired thickness of the second layer 46 is greater than about 1500 Å to about 2000 Å, one or more breaker layers 18 of the invention can be used to divide the second layer 46 into a plurality of sub-layers to reduce coating haze, with each sub-layer less than about 1500 Å to about 2000 Å thick.

Thus, as can be appreciated by one of ordinary skill in the art, the present invention provides a low emissivity coated glass substrate, e.g., having an emissivity less than about 0.2, that also has a low shading coefficient, e.g., less than about 0.5, preferably about 0.44, and low haze, e.g., less than about 1.5%, by utilizing one or more breaker layers 18 of the invention.

The present invention also provides a low emissivity solar control coating with reduced iridescence utilizing a color suppression layer 42 in conjunction with one or more doped metal oxide layers. The problems of both haze and iridescence can be addressed simultaneously by providing a coating with one or more breaker layers and a color suppression layer.

The present invention further provides a coated substrate which can have a first functional layer and a second functional layer, with a breaker layer 18 of the invention located between the two functional layers. As will be understood from the above discussion, the first functional layer could include a solar control coating layer, such as antimony doped tin oxide, or a color suppression layer. The second functional layer could include a low emissivity coating layer, such as fluorine doped tin oxide. Alternatively, the first and second functional layers could both be solar control layers or could both be low emissivity coating layers.

It will be readily appreciated by those skilled in the art that modifications may be made to the invention without departing from the concepts disclosed in the foregoing description. Accordingly, the particular embodiments described in detail herein are illustrative only and are no limiting to the scope of the invention, which is to be give the full breadth of the appended claims and any and all equivalents thereof.

EXAMPLE I

This example illustrates the use of a phosphorous containing breaker layer of the invention.

Five basic precursor components were used in this example, each of which is commercially available from ELF Atochem, N. A. The five components were monobutyltinchloride (MBTC; commercial designation ICD-1087), tetraethylorthosilicate (TEOS), triethylphosphite (TEP), trifluoroacetic acid (TFA), and a 20 percent by weight mixture of antimony trichloride in MBTC (ATC; vendor code ICD-1133).

In this example, the ATC was diluted with MBTC to provide a 7% by weight concentration of antimony trichloride in MBTC. This mixture was fed into a conventional packed column evaporator and heated to 350° F. to vaporize the mixture. Nitrogen was used as a carrier gas and was fed countercurrently through the evaporator to form a gaseous mixture of nitrogen, MBTC and antimony trichloride. This gaseous mixture was further diluted with air to 0.8 to 1.0 mole percent of reactant species. This gaseous mixture was fed into a coating station of the type disclosed in U.S. Pat. No. 4,853,257, herein incorporated by reference. The precursor mixture was directed through the coating station and onto a piece of 3.3 mm clear float glass having a temperature of about 1200° F. to about 1220° F. and moving at a rate of 400 in./min. to 720 in./min. under the coating station. As the precursor mixture contacted the glass, the thermal energy of the glass pyrolyzed the precursor components to form a crystalline antimony doped tin oxide coating region or layer on the glass. The gaseous products of the reaction and any unused chemical vapor were exhausted to a conventional thermal oxidizer followed by a bag house.

At the next coating station, MBTC and TEP were separately evaporated as described above in the presence of nitrogen carrier gas and the two gaseous precursor materials were combined to provide a 3 weight percent mixture of TEP in MBTC. This mixture was diluted with air to 0.8 to 1.0 mole percent of reactant vapor and directed through a second coating station of the same type as described above onto the previously coated glass substrate. As the mixture contacted the coated surface, the TEP and MBTC pyrolyzed to form an amorphous layer or region of tin oxide mixed with phosphorous on top of the first coating region.

At the next coating station, TFA was mixed as a liquid to a liquid MBTC feed stream to provide a mixture of 12 weight percent TFA in MBTC. This mixture was evaporated as described above in the presence of nitrogen carrier gas and further diluted with air to 0.8 to 1.0 mole percent of reactant vapor. This vapor was then directed onto the previously coated substrate at the third coating station to form a coating region or layer of tin oxide doped with fluorine over the breaker layer.

The final product was a three layer stack on 3.3 mm clear float glass. The stack is estimated to have had a first layer of antimony doped tin oxide of about 1750 Å, a phosphorous-containing tin oxide breaker layer of about 450 Å to about 650 Å, and a fluorine doped tin oxide second layer of about 3400 Å. The coated substrate had a shading coefficient of 0.44 for a single pane, a visible light transmittance of 48%, an emissivity of 0.18 and a haze of 0.8 percent. The reflected color was a pale green to greenish blue and the transmitted color was neutral gray to grayish blue. It is expected that without the breaker layer 18 the coated substrate would have a haze of greater than about 3 percent.

EXAMPLE II

This example illustrates the use of a silicon containing breaker layer of the invention.

Another coated substrate was prepared in similar manner as set forth above in Example I but at the second coating station a mixture of TEOS and MBTC was applied to form a tin oxide and silica breaker layer. The TEOS and MBTC were mixed to provide a mixture of 1.2 to 1.4 weight percent (0.5 to 0.8 mole percent) TEOS in MBTC, which was further diluted with air to 0.8 to 1.0 mole percent of reactant vapor.

The coated 3.3 nm clear float glass is estimated to have had a first layer of antimony doped tin oxide of 1750 Å, a breaker layer of tin oxide and silica of about 450 Å to 650 Å, and a fluorine doped tin oxide layer of 3400 Å.

This coated substrate had a shading coefficient of 0.44 for a single pane, a visible light transmittance of 48%, an emissivity of 0.18 and a haze of 1.5%.

EXAMPLE III

Figure 4:
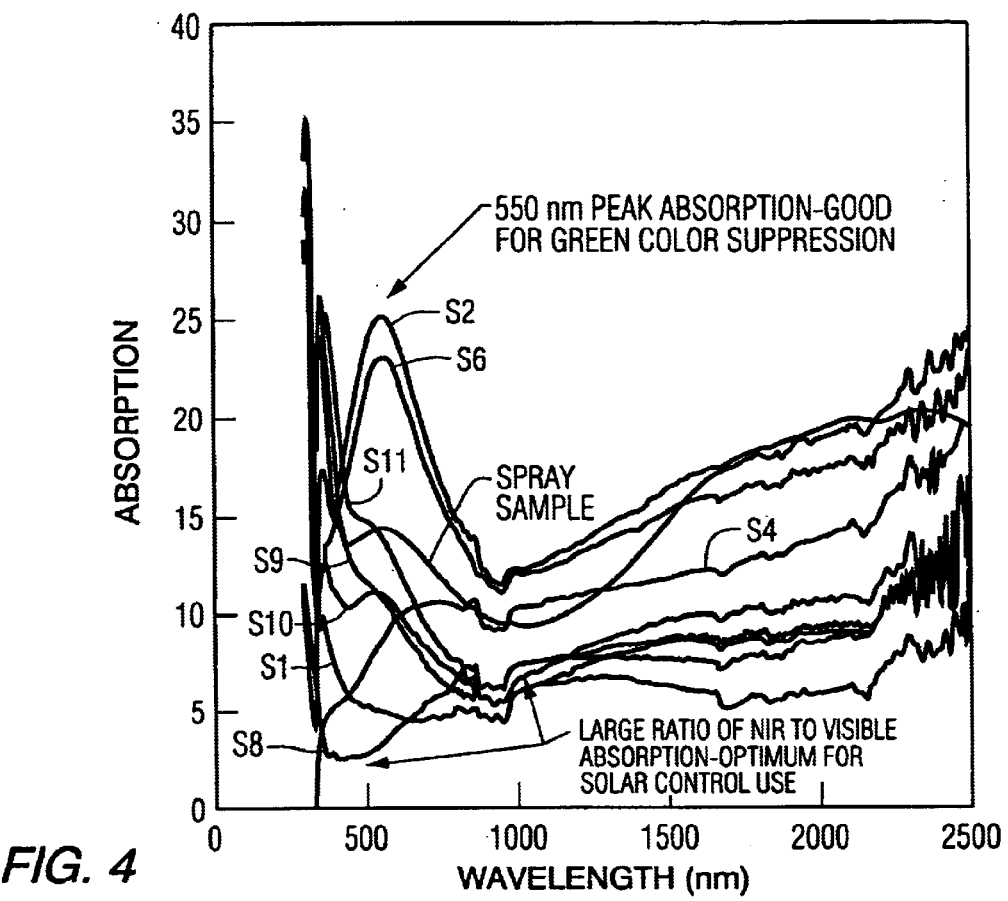
FIG. 4 is a graph of solar absorption verses wavelength for several antimony doped tin oxide coatings on clear float glass.

Looking next at the problem if iridescence, FIG. 4 shows the solar absorption of several antimony-doped tin oxide coatings deposited on clear float glass by CVD. The CVD process parameters that produced these coatings are listed in Table 1. Of course other known deposition processes can be used such as pyrolytic coating techniques and sputter coating techniques, like MSVD.

TABLE 1

| Sample # | Glass Temp. Deg. F | MBTC conc. mole % | Water conc. mole % | Gas Flow SLM[1] | Exhaust Ratio % of gas | Glass Thick. mm | Line Speed in./min |
|---|---|---|---|---|---|---|---|
| 1 | 1000 | .5 | .5 | 55 | 115 | 4 | 50 |
| 2 | 1200 | .5 | .5 | 55 | 115 | 4 | 50 |
| 4 | 1200 | .5 | 0 | 55 | 115 | 4 | 50 |
| 6 | 1200 | .1 | .5 | 55 | 115 | 4 | 50 |
| 8 | 1200 | .1 | 0 | 55 | 115 | 4 | 50 |
| 9 | 1000 | .5 | 1 | 55 | 115 | 4 | 50 |
| 10 | 1000 | 1 | .5 | 55 | 115 | 4 | 50 |
| 11 | 1000 | 1 | 1 | 55 | 115 | 4 | 50 |

[1]Standard Liters/min

The spray coating was made using a 5 weight percent mixture of an antimony precursor, such as antimony trichloride, in a metal oxide precursor, such as monobutyltintrichloride (MBTC), and was hand sprayed onto a clear glass substrate heated to about 1150 degrees F. (621° C.) The antimony precursor was fed at a constant 20 wt. % relative to the MBTC. The coater had a central inlet slot with upstream and downstream exhaust slots. The width of the coating zone was four inches and the contact length between exhausts was five inches. Air was used as the carrier gas. The metal oxide precursor breaks down on the surface of the glass substrate to form tin oxide, with the antimony dopant supplied by the breakdown of the antimony precursor.

As shown in FIG. 4, coatings 4 (S4) and 8 (S8) absorb more NIR energy than visible light, making the coatings good for solar control when high visible light transmission is needed. Coatings 2 (S2) and 6 (S6) have peak absorption at about 550 nm. These coatings are well suited for muting the green color of some conventional glass, such as Solex® glass and Solargreen® glass commercially available from PPG Industries, Inc. of Pittsburgh, Pa. Coating 10 (S10) absorbs more visible light than NIR light, coating 1 (S1) absorbs a relatively constant amount across the solar spectrum and coatings 9 (S9) and 11 (S11) absorb appreciable UV light.

A significant issue for coatings that will be glazed in the annealed and tempered states is color fastness, or color that does not change when the coated glass is heated. The appearance and performance should be the same before and after heat-treating. The antimony doped tin oxide coatings of the invention may or may not change upon heating, depending on deposition parameters. The properties of various samples and how certain properties change with heat-treating are listed in Table 2. The thickness units are Å. The sample numbers with an H after them indicate the samples after heat-treating. The samples were exposed to 1200 degree F. (649° C.) for approximately four minutes and then cooled to room temperature.

TABLE 2

| Sample | Average Film Thickness | Hall Mobility MMR H-50 (cm2/Vs) AVG | Hall Carrier Conc. MMR H-50 (*E20 Carr./cm3)[1] AVG | Hall Surf. Resist. MMR H-50 (ohm/sq.) AVG | Un-weighted Absorption UV-Vis 300–700 nm | Near IR 700–2500 nm |
|---|---|---|---|---|---|---|
| 1 | 665 | 7.52 | 2.35 | 3.E + 05 | 0.159 | 0.191 |
| 2 | 795 | 0.72 | 1.49 | 7.E + 03 | 0.307 | 0.298 |
| 4 | 310 | 0.54 | 4.57 | 9.E + 03 | 0.173 | 0.256 |
| 8 | 153 | 0.54 | 4.95 | 2.E + 04 | 0.142 | 0.211 |
| 10 | 675 | 6.70 | 6.03 | 2.E + 04 | 0.203 | 0.214 |
| 11 | 879 | 4.90 | 9.48 | 6.E + 05 | 0.254 | 0.224 |
| 1H | | 1.02 | 1.07 | 3.E + 05 | | |
| 2H | | 0.47 | 2.23 | 8.E + 03 | | |
| 4H | | 0.42 | 4.89 | 1.E + 04 | | |
| 8H | | 0.35 | 4.84 | 2.E + 04 | | |
| 10H | | 0.04 | 3.41 | 2.E + 05 | | |
| 11H | | 8.35 | 1.92 | 2.E + 05 | | |

| Sample | T | Tx | Ty | R1Y | R1x | R1y | R2Y | R2x | R2y |
|---|---|---|---|---|---|---|---|---|---|
| 1 | 67.7 | 0.312 | 0.319 | 21.0 | 0.299 | 0.307 | 17.6 | 0.294 | 0.303 |
| 2 | 50.2 | 0.295 | 0.298 | 21.8 | 0.333 | 0.337 | 16.3 | 0.324 | 0.327 |
| 4 | 76.5 | 0.306 | 0.316 | 12.2 | 0.294 | 0.297 | 9.2 | 0.280 | 0.284 |
| 8 | 85.0 | 0.307 | 0.317 | 9.2 | 0.301 | 0.308 | 8.0 | 0.295 | 0.302 |
| 10 | 76.0 | 0.313 | 0.321 | 16.0 | 0.294 | 0.302 | 13.4 | 0.295 | 0.305 |
| 11 | 67.9 | 0.309 | 0.316 | 21.3 | 0.318 | 0.330 | 17.6 | 0.318 | 0.333 |
| 1H | 70.1 | 0.312 | 0.320 | 19.2 | 0.298 | 0.306 | 16.6 | 0.293 | 0.303 |
| 2H | 52.5 | 0.296 | 0.301 | 21.5 | 0.326 | 0.330 | 16.0 | 0.315 | 0.318 |
| 4H | 76.7 | 0.306 | 0.316 | 12.2 | 0.294 | 0.297 | 9.2 | 0.280 | 0.284 |
| 8H | 85.1 | 0.307 | 0.317 | 9.2 | 0.301 | 0.308 | 8.0 | 0.295 | 0.302 |
| 10H | 72.1 | 0.312 | 0.320 | 18.3 | 0.295 | 0.304 | 16.1 | 0.291 | 0.302 |
| 11H | 69.3 | 0.309 | 0.317 | 20.5 | 0.313 | 0.325 | 18.1 | 0.309 | 0.326 |

| Sample | DE Delta T | DE Delta R1 | DE Delta R2 | Macadam T | Macadam R1 | Macadam R2 |
|---|---|---|---|---|---|---|
| 1 | 2.38 | −1.78 | −0.96 | 3.21 | 4.98 | 3.32 |
| 2 | 2.25 | −0.32 | −0.3 | 3.79 | 5.16 | 6.56 |
| 4 | 0.14 | −0.02 | 0.01 | 0.26 | 0.1 | 0.19 |
| 8 | 0.12 | −0.07 | −0.02 | 0.18 | 0.31 | 0.15 |
| 10 | −3.9 | 2.32 | 2.68 | 4.74 | 7.38 | 9.96 |
| 11 | 1.34 | −0.81 | 0.49 | 1.9 | 4.48 | 6.94 |

[1]Exponent (E) multiplied by $10^{20}$ electron carrier /cm$^3$ R1 is the reflectance from the coated side while R2 is reflectance from the uncoated side of glass and T is the Luminant transmission. Also DE is the change in color.

The optical constants for sample 8 before heat-treating are shown in Table 3 below. These optical constants are also those used in the other examples below.

TABLE 3

| Wavelength | Real Refractive Index | Imaginary Refractive Index |
|---|---|---|
| 350.0 | 1.89450 | 0.09050 |
| 360.0 | 1.88140 | 0.07227 |
| 370.0 | 1.86920 | 0.05884 |
| 380.0 | 1.85800 | 0.04934 |
| 390.0 | 1.84750 | 0.04301 |
| 400.0 | 1.83770 | 0.03929 |

TABLE 3-continued

| Wavelength | Real Refractive Index | Imaginary Refractive Index |
|---|---|---|
| 410.0 | 1.82850 | 0.03770 |
| 420.0 | 1.81990 | 0.03783 |
| 430.0 | 1.81180 | 0.03938 |
| 440.0 | 1.80420 | 0.04209 |
| 450.0 | 1.79700 | 0.04573 |
| 460.0 | 1.79020 | 0.05013 |
| 470.0 | 1.78370 | 0.05514 |
| 480.0 | 1.77760 | 0.06065 |
| 490.0 | 1.77170 | 0.06655 |
| 500.0 | 1.76610 | 0.07276 |
| 510.0 | 1.76070 | 0.07922 |
| 520.0 | 1.75550 | 0.08586 |
| 530.0 | 1.75060 | 0.09265 |
| 540.0 | 1.74580 | 0.09954 |
| 550.0 | 1.74120 | 0.10650 |
| 560.0 | 1.73670 | 0.11351 |
| 570.0 | 1.73240 | 0.12054 |
| 580.0 | 1.72820 | 0.12759 |
| 590.0 | 1.72420 | 0.13463 |
| 600.0 | 1.72020 | 0.14165 |
| 610.0 | 1.71610 | 0.14865 |
| 620.0 | 1.71250 | 0.15563 |
| 630.0 | 1.70880 | 0.16256 |
| 640.0 | 1.70520 | 0.16947 |
| 650.0 | 1.70160 | 0.17633 |
| 660.0 | 1.69810 | 0.18315 |
| 670.0 | 1.69470 | 0.18993 |
| 680.0 | 1.69120 | 0.19667 |
| 690.0 | 1.68790 | 0.20337 |
| 700.0 | 1.68460 | 0.21003 |
| 710.0 | 1.68130 | 0.21665 |
| 720.0 | 1.67800 | 0.22323 |
| 730.0 | 1.67480 | 0.22979 |
| 740.0 | 1.67150 | 0.23631 |
| 750.0 | 1.66830 | 0.24280 |
| 760.0 | 1.66520 | 0.24926 |
| 770.0 | 1.66200 | 0.25570 |
| 780.0 | 1.65880 | 0.26212 |
| 790.0 | 1.65570 | 0.26852 |
| 800.0 | 1.65260 | 0.27491 |
| 810.0 | 1.64940 | 0.28128 |
| 820.0 | 1.64630 | 0.28764 |
| 830.0 | 1.64310 | 0.29399 |
| 840.0 | 1.64000 | 0.30033 |
| 850.0 | 1.63680 | 0.30668 |
| 860.0 | 1.63370 | 0.31302 |
| 870.0 | 1.63050 | 0.31936 |
| 880.0 | 1.62730 | 0.32571 |
| 890.0 | 1.62410 | 0.33206 |
| 900.0 | 1.62090 | 0.33842 |
| 910.0 | 1.61770 | 0.34480 |
| 920.0 | 1.61450 | 0.35118 |
| 930.0 | 1.61120 | 0.35759 |
| 940.0 | 1.60790 | 0.36401 |
| 950.0 | 1.60460 | 0.37045 |
| 960.0 | 1.60130 | 0.37691 |
| 970.0 | 1.59800 | 0.38339 |
| 980.0 | 1.59460 | 0.38990 |
| 990.0 | 1.59120 | 0.39644 |
| 1000.0 | 1.58780 | 0.40301 |
| 1010.0 | 1.58440 | 0.40961 |
| 1020.0 | 1.58090 | 0.41624 |
| 1030.0 | 1.57740 | 0.42290 |
| 1040.0 | 1.57390 | 0.42960 |
| 1050.0 | 1.57040 | 0.43634 |
| 1060.0 | 1.56680 | 0.44311 |
| 1070.0 | 1.56320 | 0.44993 |
| 1080.0 | 1.55950 | 0.45679 |
| 1090.0 | 1.55580 | 0.46369 |
| 1100.0 | 1.55210 | 0.47064 |
| 1110.0 | 1.54840 | 0.47763 |
| 1120.0 | 1.54460 | 0.48467 |
| 1130.0 | 1.54080 | 0.49175 |
| 1140.0 | 1.53700 | 0.49889 |
| 1150.0 | 1.53310 | 0.50608 |
| 1160.0 | 1.52920 | 0.51332 |

TABLE 3-continued

| Wavelength | Real Refractive Index | Imaginary Refractive Index |
|---|---|---|
| 1170.0 | 1.52520 | 0.52061 |
| 1180.0 | 1.52120 | 0.52796 |
| 1190.0 | 1.51720 | 0.53536 |
| 1200.0 | 1.51310 | 0.54282 |
| 1210.0 | 1.50900 | 0.55033 |
| 1220.0 | 1.50480 | 0.55791 |
| 1230.0 | 1.50070 | 0.56554 |
| 1240.0 | 1.49640 | 0.57324 |
| 1250.0 | 1.49220 | 0.58099 |
| 1260.0 | 1.48790 | 0.58881 |
| 1270.0 | 1.48350 | 0.59669 |
| 1280.0 | 1.47910 | 0.60463 |
| 1290.0 | 1.47470 | 0.61264 |
| 1300.0 | 1.47020 | 0.62072 |
| 1310.0 | 1.46570 | 0.62886 |
| 1320.0 | 1.46110 | 0.63707 |
| 1330.0 | 1.45650 | 0.64534 |
| 1340.0 | 1.45180 | 0.65369 |
| 1350.0 | 1.44710 | 0.66210 |
| 1360.0 | 1.44240 | 0.67058 |
| 1370.0 | 1.43760 | 0.67914 |
| 1380.0 | 1.43280 | 0.68777 |
| 1390.0 | 1.42790 | 0.69647 |
| 1400.0 | 1.42300 | 0.70524 |
| 1410.0 | 1.41800 | 0.71408 |
| 1420.0 | 1.41300 | 0.72300 |
| 1430.0 | 1.40790 | 0.73200 |
| 1440.0 | 1.40280 | 0.74107 |
| 1450.0 | 1.39760 | 0.75022 |
| 1460.0 | 1.39240 | 0.75944 |
| 1470.0 | 1.38720 | 0.76874 |
| 1480.0 | 1.38190 | 0.77812 |
| 1490.0 | 1.37650 | 0.78758 |
| 1500.0 | 1.37110 | 0.79712 |
| 1510.0 | 1.36560 | 0.80674 |
| 1520.0 | 1.36010 | 0.81643 |
| 1530.0 | 1.35460 | 0.82621 |
| 1540.0 | 1.34900 | 0.83607 |
| 1550.0 | 1.34330 | 0.84601 |
| 1560.0 | 1.33760 | 0.85604 |
| 1570.0 | 1.33190 | 0.86614 |
| 1580.0 | 1.32610 | 0.87633 |
| 1590.0 | 1.32020 | 0.88661 |
| 1600.0 | 1.31430 | 0.89697 |
| 1610.0 | 1.30830 | 0.90741 |
| 1620.0 | 1.30230 | 0.91794 |
| 1630.0 | 1.29630 | 0.92855 |
| 1640.0 | 1.29020 | 0.93926 |
| 1650.0 | 1.28400 | 0.95004 |
| 1660.0 | 1.27780 | 0.96092 |
| 1670.0 | 1.27150 | 0.97188 |
| 1680.0 | 1.26520 | 0.98293 |
| 1690.0 | 1.25880 | 0.99407 |
| 1700.0 | 1.25230 | 1.00530 |
| 1710.0 | 1.24580 | 1.01660 |
| 1720.0 | 1.23930 | 1.02800 |
| 1730.0 | 1.23270 | 1.03950 |
| 1740.0 | 1.22600 | 1.05110 |
| 1750.0 | 1.21930 | 1.06280 |
| 1760.0 | 1.21260 | 1.07460 |
| 1770.0 | 1.20580 | 1.08640 |
| 1780.0 | 1.19890 | 1.09840 |
| 1790.0 | 1.19190 | 1.11040 |
| 1800.0 | 1.18500 | 1.12260 |
| 1810.0 | 1.17790 | 1.13480 |
| 1820.0 | 1.17080 | 1.14720 |
| 1830.0 | 1.16370 | 1.15960 |
| 1840.0 | 1.15650 | 1.17210 |
| 1850.0 | 1.14920 | 1.18470 |
| 1860.0 | 1.14190 | 1.19740 |
| 1870.0 | 1.13450 | 1.21020 |
| 1880.0 | 1.12700 | 1.22310 |
| 1890.0 | 1.11950 | 1.23610 |

The application of a coating that selectively or preferentially absorbs NIR solar light as opposed to visible light would be helpful in making a good solar control stack. A single layer of antimony doped tin oxide, with the optical properties listed above, that is 800 Å thick is predicted to have about a 69% visible transmission and about a 58% TSET. The antimony doped tin oxide layer of the invention is preferably about 700 Å to about 3,000 Å thick. Antimony doped tin oxide absorbs light across the entire solar spectrum. It also has a very high absorption of green light. Thus, by placing an antimony doped tin oxide containing coating on a green glass substrate, the transmitted color can be changed from green to gray, creating a high performance solar control glass with neutral aesthetics.

Theoretical coatings described below were molded using a commercially available "TFCalc" software program, as described in more detail hereinbelow.

PREDICTIVE EXAMPLE IV

Figure 5:
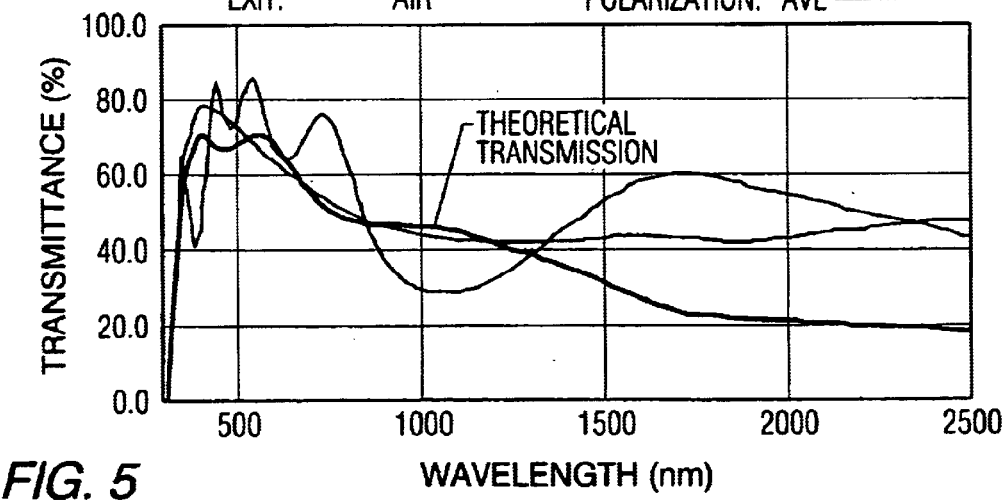
FIG. 5 is a graph of transmittance verses wavelength for a coated article of the invention.

An antimony doped tin oxide layer can be combined with an additional doped metal oxide layer, such as a fluorine doped tin oxide layer, an indium doped tin oxide layer or a mixture of indium and fluorine doped tin oxides to achieve both low emissivity and a reduction in transmission. The fluorine and/or indium doped tin oxide has a higher refractive index than that of antimony doped tin oxide. Fluorine doped tin oxide is electrically conductive and has a high refractive index in the UV and visible parts of the spectrum and low refractive index in the NIR. For purposes of discussion, the term "high refractive index" generally means a refractive index greater than about 1.9 and "low refractive index" means a refractive index less than about 1.6. "Medium refractive index" refers to a refractive index between about 1.6–1.9. In the invention, the fluorine doped thin oxide coating is between about 0 Å to about 3,000 Å thick, preferably the thickness of the fluorine doped tin oxide layer is inversely related to the thickness of the antimony doped tin oxide layer. When the antimony doped tin oxide layer is near its upper preferred limit, i.e., about 3,000 Å, the fluorine doped tin oxide layer is preferably at or near its lower preferred limit, i.e., about 0 Å. Conversely, when the antimony doped tin oxide is near its lower preferred limit, i.e., 700 Å, the fluorine doped tin oxide is preferably near its upper preferred limit, i.e., 3000 Å. FIG. 5 shows the theoretical light transmission from a graded layer, antimony-doped tin oxide and fluorine-doped tin oxide coating. The total (TSET) is about 51% and the visible light transmission is about 69%. The TSET and visible light transmission can be altered with this design by varying the thickness of the antimony-doped tin oxide layer or by changing the antimony concentration in the coating. As a general rule, when the thickness of the antimony-doped tin oxide layer increases or when the antimony concentration increases, the TSET and visible light transmission decrease.

Figure 6:
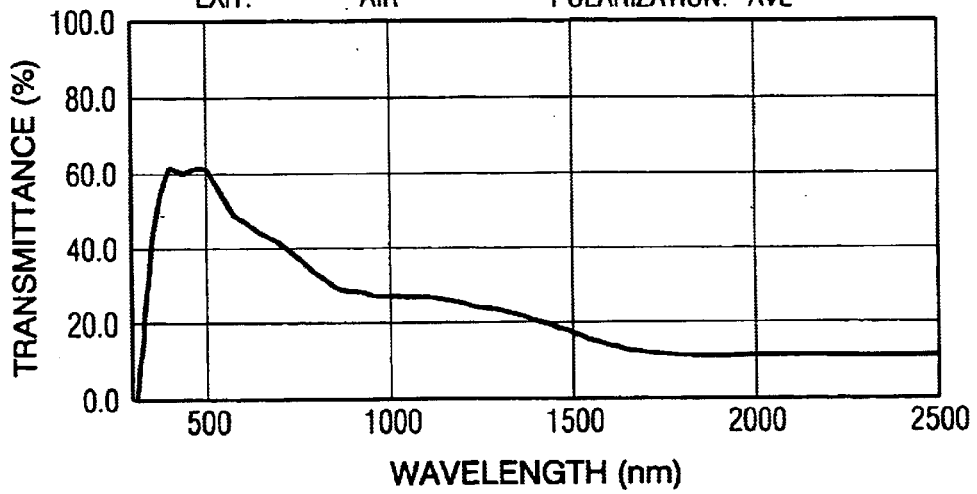
FIG. 6 is a graph of transmittance verses wavelength for a coated article of the invention having a thicker antimony doped tin oxide layer than that of FIG. 5.

Government regulations are driving the performance of windows. A new performance target for the southern USA is for windows to have a shading coefficient about 0.45. This can be achieved with a TSET of about 37%. The coating described for FIG. 5 can be altered to reach this target by increasing the thickness of the antimony-doped tin oxide layer. The transmission curve for this coating is shown in FIG. 6. This coating has a visible light transmission of about 52% and a TSET of about 37%. The fluorine-doped tin oxide coating as the top layer will give this coating an emissivity less than about 0.35. The graded layer thickness is 800 Å, the antimony-doped tin oxide is 1800 Å and the fluorine-doped tin oxide is 1800 Å in this example.

Figure 7:
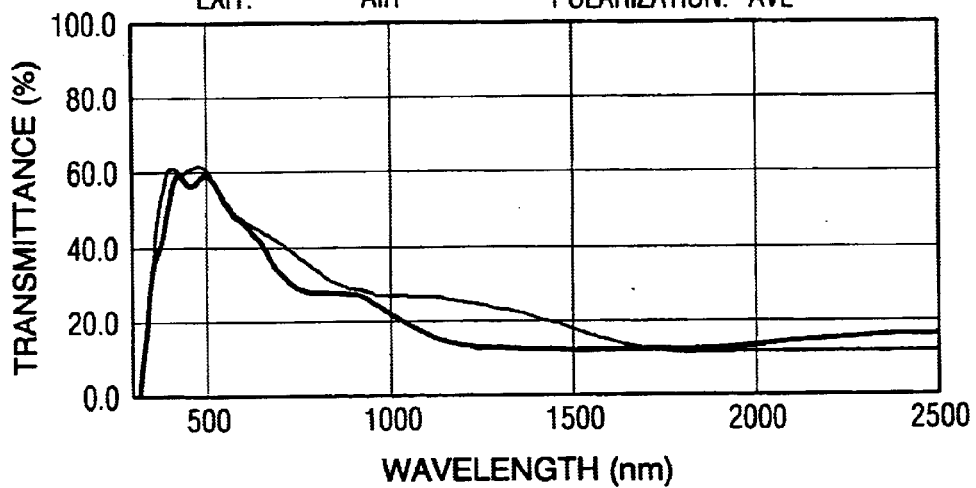
FIG. 7 is a graph of transmittance verses wavelength for a coated article with and without a titanium oxide layer.

The TSET of this coating can be further reduced by in the application of a quarter wave high index layer, such as $TiO_2$, onto the top of the graded, antimony-doped tin oxide and fluorine-doped tin oxide article discussed above. The TSET drops to 32.5% but the visible transmission only drops to 51%. The transmission curve of these stacks, with and without the $TiO_2$ layer, is shown in FIG. 7.

Theoretical coatings were modeled using the commercially available TFCalc software program. The solar heat transmittance was calculated using an integrated air mass of 1.5 as defined in ASTM E 891-87. The visible transmittance was calculated from the TFCalc output using Illuminant C. The color suppression layer was approximated by a layer made up of 20 slices with small changes in refractive index. The number of slices was varied to obtain a specific refractive index at the top of the graded index layer. The refractive indices of the slices varied from 1.5 up to 2.0 by increments of 0.05. This approximation for the graded index layer was made because the software does not have the ability to model a coating with a continuously changing refractive index. Such an approximation method is well known in the art of modeling coatings. The optical constants described below of the graded layer are constant as a function of the wavelength over the solar spectrum. This example is for a coating designed for a wavelength of 1230 nm. The graded layer has a refractive index of 2.0 at the top and the slices are 10 nm thick.

For varying doped metal oxide layers, the refractive index is important. The fluorine doped tin oxide layer was modeled having a refractive index of 1.42 at the design wavelength. The incident medium is air with a refractive index of 1.0. The antimony doped tin oxide layer was modeled having a refractive index of 1.680 at the design wavelength. The physical thickness of the fluorine doped tin oxide layer would be 2166 angstroms and of the antimony doped tin oxide layer 3664 angstroms. This modeled coating theoretically reduces the reflectance over the wavelength range from 1045 nm to 1500 nm compared with an uncoated substrate. The visible transmission is 40.01%, the solar heat transmission is 27.2 and the difference between the two is 12.80%. The difference in refractive indices between the fluorine doped tin oxide and antimony doped tin oxide layers is 0.174 at 500 nm, the center of the visible spectrum, and the difference between the refractive indices is 0.260 at 1230 nm, the designed wavelength in the near IR. This coating also has a neutral reflected color.

PREDICTIVE EXAMPLE V

A similar modeling as in Predictive Example IV was done for a coating for a wavelength of 550 nm. The color suppression layer was modeled having a refractive index of 2.0 at the top with slices 10 nm thick. The fluorine doped tin oxide layer had a refractive index at the design wavelength of 2.0. The incident median had a refractive index of 2.0. The antimony doped tin oxide layer had a refractive index of 1.826 at the designed wavelength. The physical thickness of the fluorine doped tin oxide layer is 702 Å and the antimony doped tin oxide layer is 1539 Å. This coating reduces the reflectance over the wave length range from about 300 nm to about 1160 nm compared to the uncoated substrate. This coated article is designed for an incident medium of 2.0 but it could be used in an incident medium with a different refractive index, such as air with a refractive index of 1.0. For air, the calculated relevant values would be: visible transmission 62.28, solar heat transmission 49.54, with a difference between the two of 12.75%. The difference in refractive indices between the fluorine doped tin oxide and antimony doped tin oxide layers is 0.174 at 500 nm, the center of the visible spectrum, and the difference between the refractive indices is 0.260 at 1230 nm, a wavelength in the near IR. The coating has a neutral reflected color.

PREDICTIVE EXAMPLE VI

In the above-described embodiment, a color suppression layer was used to prevent iridescence of the coated article. However, in a further embodiment of the invention, no color suppression layer is required. It has been discovered that a novel combination of antimony doped tin oxide and fluorine doped tin oxide produces a coated article having a neutral reflected color and a low emissivity. In this embodiment of the invention, a substrate, such as glass, has an antimony doped tin oxide layer deposited thereover, for example as described above. The antimony doped tin oxide layer is preferably about 900 Å to about 1500 Å thick, more preferably about 1200 Å thick. A fluorine doped tin oxide layer is then deposited over the antimony doped tin oxide layer in conventional manner. The fluorine doped tin oxide layer preferably has a thickness of about 2300 Å to about 3600 Å, providing a transparent conduction oxide having little or no transmitted color. However, the thickness of the fluorine doped tin oxide layer can be varied such that the color of the resulting article is varied but remains "robust". Robust is used herein to mean that the color is substantially insensitive to changes in the film thickness.

The antimony doped tin oxide layer is preferably about 900 Å to about 1500 Å thick, more preferably about 1200 Å thick. The antimony doped tin oxide can have a single concentration of antimony oxide or it may be segmented into two or more layers or strata of different antimony concentrations. One way of making such strata is disclosed in U.S. Pat. No. 5,356,718 discussed above. However, any known method for making a layer with more than one concentration of a selected material can be used. The presence of multiple strata of different concentrations of antimony oxide and/or the appropriate thickness of the antimony doped tin oxide creates a situation where turning points develop in the color of the resulting multi-layer. FIG. 8 shows how the color of the multi-layer varies with changes in the thickness of the fluorine doped tin oxide layer. The color circles around neutral, the center of which is defined as X=0.333 and Y=0.333. The inner spiral is the transmitted color and the outer spiral is the reflected color. There are no points along the reflected color spiral in which the color sharply changes, all changes are gradual. The theoretical parameters for FIG. 8 are shown to the right of the graph. These parameters are: color standard 1931 CIE; Field of view 2"; polarization: average; Reference white: CIE-C; Illuminant: white; Incident angle: 0.00°; X coordinate is 0.338 for reflection and 0.321 for transmission; y coordinate is 0.371 for reflection and 0.323 for transmission; luminosity is 14.24 for reflection and 60.18 for transmission; dominant (nm) is 569 for reflection and 585 for transmission; complementing (nm) is 450 for reflection and 484 for transmission; and excitation purity is 0.223 for reflection and 0.047 for transmission. The color spirals of FIGS. 8–10 were generated using the TFCalc software.

Preferred coatings are those that have sharp turning points near the neutral point. An additional embodiment of the invention will now be described. FIG. 9 shows the color spirals for this additional embodiment of the invention having two antimony doped tin oxide stratas. The first strata is 985 Å thick and the second strata is 214 Å thick. The fluorine doped tin oxide layer ranges from about 1200 Å to about 3600 Å. Sharp turning points occur at X=0.3, Y=0.34 and X=0.34, Y=0.32. These two points represent robust points. The second point is a bit more neutral than the first.

Figure 10:
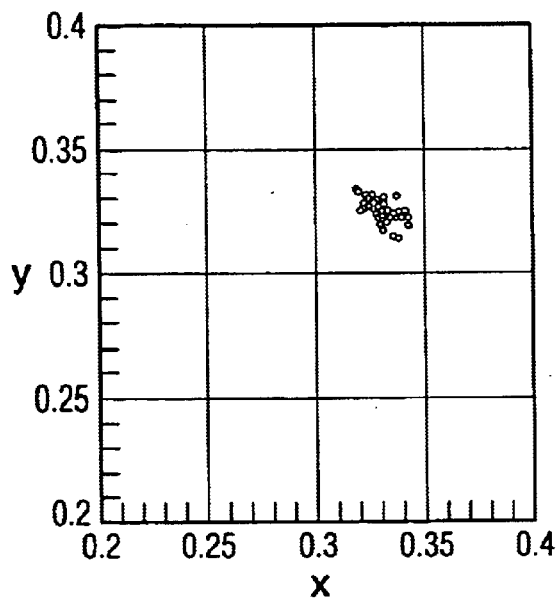
FIG. 10 is a graph of color variation with changes in antimony doped tin oxide strata thickness for the coating of FIG. 9.

The color sensitivity of the overall design can be calculated around the neutral point. FIG. 10 shows how the color varies for a thickness variation of each strata of ±75 Å. The color standard, field of view, polarization, reference white, illuminant and incident angle are the same for FIGS. 9 and 10 as they were for FIG. 8. However, the remaining parameters were changed as follows (for the following settings, the first number is for reflection and the number in parentheses is for transmission). For FIG. 6, the X coordinate was 0.305 (0.325); y coordinate 0.342 (0.325); luminosity 11.06 (57.92); dominant 539 nm (584 nm); complementary N/A (483 nm) and excitation purity 0.057 (0.065). For FIG. 7, x coordinate 0.333 (0.322); y coordinate 0.326 (0.328); luminosity 10.55 (56.63); dominant 589 nm (578 nm); complementary 486 nm (478 nm); and excitation purity 0.086 (0.064).

What is claimed is:

1. A coating over a portion of a surface of a substrate, the coating, comprising:
   a first substantially crystalline metal oxide coating layer having a first surface and an opposite surface defined as a second surface of the first coating layer with crystal size within the first coating layer increasing in a direction from the first surface of the first coating layer toward the second surface of the first coating layer;
   a second substantially crystalline metal oxide coating layer having a first surface and an opposite surface defined as a second surface of the second coating layer with the first surface of the second layer in facing relationship to the second surface of the first layer and with crystal size within the second layer increasing in a direction from the first surface of the second layer toward the second surface of the second layer, and
   at least one breaker layer comprising a metal oxide having at least phosphorous between the second surface of the first layer and the first surface of the second, the breaker layer interrupting crystal structure of the coating.

2. The coating according to claim 1, wherein the breaker layer is substantially amorphous.

3. The coating according to claim 1, wherein at least one of the first and second coating comprises layers at least one dopant.

4. The coating according to claim 1, wherein the breaker layer further comprises silicon.

5. A coating over a portion of a surface of a substrate, the coating, comprising:
   a substantially crystalline first metal oxide layer having a first surface and an opposite surface defined as a second surface of the first layer with crystal size within the first layer increasing in a direction from the first surface of the first layer toward the second surface of the first layer;
   a substantially crystalline second metal oxide layer deposited over the first layer, the second layer having a first surface and an opposite surface defined as a second surface of the second layer with the first surface of the second layer in facing relationship to the second surface of the first layer and with crystal size within the second layer increasing in a direction from the first surface of the second layer toward the second surface of the second layer, and
   a breaker layer comprising an amorphous tin oxide layer having at least phosphorous or silica between the first and second layers, to prevent or at least reduce epitaxial growth of the second layer on the first layer.

6. The coating according to claim 5, wherein the first layer comprises a metal oxide having at least one dopant.

7. The coating according to claim 5, wherein the first layer has a thickness of about 1000 Å to about 2300 Å.

8. The coating according to claim 5, wherein at least one of the first and second layers comprises (a) a metal oxide selected from the group consisting of oxides of Zn, Fe, Mn, Al, Ti, In, Zr, Ce, Sn, Si, Cr, Sb, Co, and mixtures thereof, and (b) at least one dopant selected from the group consisting of Sn, Sb, F, In, and mixtures thereof.

9. The coating according to claim 5, wherein the second layer has a thickness of about 2000 Å to about 5000 Å.

10. The coating according to claim 5, wherein the breaker layer has a thickness of about 100 Å to about 1000 Å.

11. A coating over a portion of a surface of a substrate, the coating, comprising:
    a substantially crystalline first layer comprising antimony doped tin oxide, the first layer having a thickness of about 1200 Å to about 2300 Å, and having a first surface and an opposite surface defined as a second surface of the first layer with crystal size within the first layer increasing in a direction from the first surface of the first layer toward the second surface of the first layer;
    a substantially crystalline second layer deposited over the first layer, the second layer comprising fluorine doped tin oxide and having a thickness of about 3000 Å to about 3600 Å and having a first surface and an opposite surface defined as a second surface of the second layer with the first surface of the second layer in facing relationship to the second surface of the first layer and with crystal size within the second layer increasing in a direction from the first surface of the second layer toward the second surface of the second layer, and
    a breaker layer between the first and second crystalline layers, the breaker layer comprising a tin oxide having at least phosphorous to prevent or at least reduce epitaxial growth of crystals at the first surface of the second layer on the crystals at the second surface of the first layer.

12. A coating over a portion of a substrate, comprising:
    a substantially crystalline first layer comprising antimony doped tin oxide, the first layer having a thickness of about 1200 Å to about 2300 Å;
    a substantially crystalline second layer deposited over the first layer, the second layer comprising fluorine doped tin oxide and having a thickness of about 3000 Å to about 3600 Å; and
    a breaker layer located between the first and second crystalline layers, the breaker layer selected from a group of a metal oxide layer having at least phosphorous and a layer of a mixed oxide of tin and silica, wherein the breaker layer prevents or at least reduces epitaxial growth of the second layer on the first layer, and the breaker layer has a thickness of about 100 Å to about 1000 Å.

13. A coated article, comprising:
    a substrate; and
    a coating deposited over at least a portion of the substrate, the coating comprising:
    a first metal oxide coating layer having crystallinity, and a first surface and an opposite surface defined as a second surface of the first coating layer with crystal size within the first coating layer increasing in a direction from the first surface of the first coating layer toward the second surface of the first coating layer;
    a second metal oxide coating layer having crystallinity, and a first surface and an opposite surface defined as a second surface of the second coating layer with the first surface of the second layer in facing relationship to the second surface of the first layer and with crystal size within the second layer increasing in a direction from the first surface of the second layer toward the second surface of the second layer, and at least one breaker layer between the second surface of the first layer and the first surface of the second, wherein the breaker layer is selected from the group of a substantially amorphous metal oxide layer having at least phosphorous and a substantially amorphous mixed oxide layer of tin and silica, the breaker layer configured to interrupt crystal structure of the coating whereby the size of the crystals at the second surface of the first layer are larger than size of the crystals at the first surface of the second layer.

14. The coated article according to claim 13, wherein the first coating layer further comprises at least one dopant.

15. The coated article according to claim 13, wherein the second layer further comprises at least one dopant.

16. A coated article, comprising:

a substrate;

a substantially crystalline first layer deposited over at least a portion of the substrate, the first layer having a first surface and an opposite surface defined as a second surface of the first layer with crystal size within the first layer increasing in a direction from the first surface of the first layer toward the second surface of the first coating layer wherein the first layer comprises a metal oxide selected from the group consisting of oxides of Zn, Fe, Mn, Al, Ti, In, Zr, Ce, Sn, Si, Cr, Sb, Co, and mixtures thereof and at least one dopant selected from the group consisting of Sn, Sb, F, In, and mixtures thereof;

an amorphous metal oxide breaker layer having phosphorous deposited over the second surface of the first layer; and a substantially crystalline metal oxide second layer deposited over the breaker layer, the second layer having a first surface and an opposite surface defined as a second surface of the second layer with the first surface of the second layer in facing relationship to the second surface of the first layer and with crystal size within the second layer increasing in a direction from the first surface of the second layer toward the second surface of the second layer, wherein the breaker layer is configured to inhibit epitaxial growth of the second crystalline layer on the first crystalline layer.

17. The coated article according to claim 16, wherein the substrate is selected from the group consisting of glass, ceramic, and plastic.

18. The coated article according to claim 16, wherein the first layer has a thickness of about 1200 Å to about 2300 Å.

19. The coated article according to claim 16, wherein the breaker layer has a thickness of about 100 Å to about 1000 Å.

20. The coated article according to claim 16, wherein the metal oxide of the breaker layer comprises a tin oxide.

21. The coated article according to claim 16, wherein the metal oxide of the breaker layer comprises tin oxide and further comprising a dopant selected from silica and mixtures of phosphorous and silica.

22. The coated article according to claim 16, wherein the second layer further comprises at least one dopant.

23. The coated article according to claim 22, wherein the metal oxide of the second layer comprises a metal oxide selected from the group consisting of oxides of Zn, Fe, Mn, Al, Ti, In, Zr, Ce, Sn, Si, Cr, Sb, Co, and mixtures thereof, and the at least one dopant is selected from the group consisting of Sn, Sb, F, In, and mixtures thereof.

24. The coated article according to claim 16, wherein the doped metal oxide of the first layer includes antimony doped tin oxide, with an atomic ratio of antimony to tin of about 8.0 to about 12.0.

25. The coated article according to claim 22, wherein the doped metal oxide of the second layer comprises fluorine doped tin oxide, with the fluorine present in an amount of less than about 5 atomic percent.

26. The coated article according to claim 20, wherein the breaker layer has a phosphorous to tin atomic ratio of about 0.001 to about 0.10.

27. The coated article according to claim 21, wherein the breaker layer has a silica to tin atomic ratio of about 0.005 to about 0.050.

28. A coated article, comprising:

a substrate;

a substantially crystalline metal oxide layer deposited over at least a portion of the substrate, the layer having a first surface and an opposite surface defined as a second surface of the layer with crystal size within the layer increasing in a direction from the first surface of the layer toward the second surface of the layer; and a breaker layer deposited over at least a portion of the second surface of the layer, the breaker layer selected from the group of a metal oxide layer having at least phosphorous and a mixed oxide layer of tin and silica, the breaker layer configured to prevent or at least reduce epitaxial growth from initiating on the second surface of the layer.

29. A coated article, comprising:

a substrate;

an antimony doped tin oxide layer deposited over the substrate and having a thickness of about 900 Å to about 1500 Å; and a fluorine doped tin oxide layer deposited over the antimony doped tin oxide layer and having a thickness of about 1200 Å to about 3600 Å, wherein the antimony doped tin oxide layer has at least two stratas of different antimony concentrations, with a first strata having a thickness of about 985 Å and a second strata having a thickness of about 214 Å.

30. A coated article, comprising:

a substrate;

a color suppression layer deposited over at least a portion of the substrate, the color suppression layer comprising a gradient layer which transitions from one metal oxide or nitride to another;

a substantially crystalline metal oxide first layer deposited over the color suppression layer, the first layer having a first surface and an opposite surface defined as a second surface of the first layer with crystal size within the first layer increasing in a direction from the first surface of the first layer toward the second surface of the first coating layer wherein the first surface of the first layer is over the color suppression layer;

a substantially crystalline metal oxide second layer deposited over the first layer, the second layer having a first surface and an opposite surface defined as a second surface of the second layer with the first surface of the second layer in facing relationship to the second surface of the first layer and with crystal size within the second layer increasing in a direction from the first surface of the second layer toward the second surface of the second layer, and a breaker layer between the first and second layers, the breaker layer comprising an amorphous metal oxide layer having at least phosphorous to prevent or reduce epitaxial growth of the first surface of the second layer on the second surface of the first layer.

31. The article as claimed in claim 30, wherein the breaker layer further comprises materials selected from the group of silica and mixtures of silica and phosphorous.

32. The article as claimed in claim 30, wherein the first layer comprises antimony doped tin oxide.

33. The article as claimed in claim 30, wherein the second layer comprises fluorine doped tin oxide.

34. A coated article comprising:

a substrate;

a first coating region deposited over at least a portion of the substrate, the first coating region comprising a metal oxide and a first dopant, the first coating region having a first surface and an opposite surface defined as a second surface of the first coating region with crystal size within the first coating region increasing in a direction from the first surface of the first coating region toward the second surface of the first coating region wherein the first surface of the first coating region is over the substrate;

a transition region deposited over the first region, the transition region comprising a metal oxide, the first dopant, and a second dopant, with the ratio of the first dopant to the second dopant constantly changing as the distance from the substrate changes wherein, the transition region has a first surface and an opposite surface defined as a second surface of the transition region with crystal size within the transition region increasing in a direction from the first surface of the transition region toward the second surface of the transition region wherein the first surface of the transition region is over the second surface of the first coating region;

a second coating region deposited over the transition region, the second coating region comprising a metal oxide and the second dopant, the second coating region having a first surface and an opposite surface defined as a second surface of the second coating region with crystal size within the, second coating region increasing in a direction from the first surface of the second coating region toward the second surface of the coating region wherein the first surface of the second coating region is over the second surface of the transition region, and at least one breaker layer selected from the group of a metal oxide layer having at least phosphorous and a mixed oxide layer of tin and silica, the at least one breaker layer located between at least one of the following groups to prevent or reduce epitaxial growth between the at least one of the following groups: (a) the second surface of the first region and the first surface of the transition region, or (b) the second surface of the transition region and the first surface of the second region.

35. A method of coating a substrate, comprising the steps of:

depositing a substantially crystalline metal oxide layer defined as a first layer over at least a portion of a substrate, the first layer having a first surface and an opposite surface defined as a second surface of the first coating layer with the first surface of the first layer over the substrate and with crystal size within the first layer increasing in a direction from the first surface of the first layer toward the second surface of the first layer;

depositing a breaker layer over the second surface of the first layer, the breaker layer selected from the group of a metal oxide layer having at least phosphorous and a mixed oxide layer of tin and silica; and depositing a substantially crystalline metal oxide layer defined as a second layer over the breaker layer, the second layer having a first surface and an opposite surface defined as a second surface of the second layer with the first surface of the second layer over the breaker layer and with crystal size within the second layer increasing in a direction from the first surface of the second layer toward the second surface of the second layer, wherein the breaker layer is configured to prohibit or reduce epitaxial growth of the second crystalline layer on the first crystalline layer.

36. A method of coating a substrate, comprising the steps of:

depositing a substantially crystalline metal oxide layer over at least a portion of a substrate, the layer having a first surface and an opposite surface defined as a second surface of the layer with crystal size within the layer increasing in a direction from the first surface of the layer toward the second surface of the layer, and depositing a breaker layer over the second surface of the crystalline layer, wherein the breaker layer is selected from the group of a metal oxide layer having at least phosphorous and a mixed oxide layer of tin and silica to prevent or at least reduce epitaxial growth from initiating on the second surface of the first crystalline layer.

* * * * *